US007940749B2

(12) United States Patent
Lu et al.

(10) Patent No.: US 7,940,749 B2
(45) Date of Patent: May 10, 2011

(54) COMMON COMMUNICATION TERMINAL ARCHITECTURE AND METHOD

(76) Inventors: Wei Lu, Cupertino, CA (US); Jianhong Hu, Cupertino, CA (US)

( * ) Notice: Subject to any disclaimer, the term of this patent is extended or adjusted under 35 U.S.C. 154(b) by 899 days.

(21) Appl. No.: 11/856,040

(22) Filed: Sep. 15, 2007

(65) Prior Publication Data

US 2009/0075654 A1    Mar. 19, 2009

(51) Int. Cl.
*H04L 12/66*    (2006.01)
(52) U.S. Cl. ........ 370/352; 370/328; 370/338; 455/445; 455/433
(58) Field of Classification Search .................. 370/310, 370/328, 338, 351, 352, 400, 401; 455/412.1, 455/412.2, 413, 422.1, 432.1, 433, 435.1, 435.2, 445

See application file for complete search history.

(56) References Cited

U.S. PATENT DOCUMENTS

| 6,925,299 | B1 * | 8/2005 | Sofer et al. ................. 455/414.2 |
| 7,463,622 | B2 * | 12/2008 | Lu et al. ......................... 370/352 |
| 2003/0224795 | A1 * | 12/2003 | Wilhoite et al. .............. 455/445 |

* cited by examiner

*Primary Examiner* — Chi H Pham
*Assistant Examiner* — Weibin Huang (57) ABSTRACT

A common communication terminal system and method of converging mobile cellular communications, wireless access systems, wireless local area network and wireline communications into one Open Wireless Architecture (OWA) platform supporting cost-effective and spectrum-efficient broadband services across wireless and wired communication environment in one single terminal device with one unified telephone number for office, home and mobile communications.

7 Claims, 5 Drawing Sheets

Incoming Call Processing Management System in Mobile Switching Center or Gateway

FIG. 1

Hardware Architecture of Common Wired and Wireless Mobile Terminal

FIG. 2

Incoming Call Processing Management System in Mobile Switching Center or Gateway Network Access Control in the Common Wired / Wireless Terminal

User Home Computer Server as Virtual Mobile Server

FIG. 5 The common wired and wireless terminal of the invention

COMMON COMMUNICATION TERMINAL ARCHITECTURE AND METHOD

BACKGROUND OF THE INVENTION

1. Field of the Invention

This invention relates to an open and common communication terminal system and method of converging the mobile cellular communications, wireless access systems and wired communications into one common platform architecture, supporting cost-effective and spectrum-efficient broadband voice, data and video services in both wireless and wired environment with one single common communication terminal device. The invention includes innovative system architecture in the common terminal and minimum modification in the existing mobile communication infrastructures.

2. Description of the Related Art

Wireless communications comprises a wide range of technologies, services and applications that have come into existence to meet the particular needs of different market sectors and user environments. Different systems can be broadly characterized by:

- content and services offered;
- frequency bands of operation;
- standards defining the systems;
- data rates supported;
- bidirectional and unidirectional delivery mechanisms;
- degree of mobility;
- regulatory requirements; and
- cost.

The service requirements for telecommunications remain the following characteristics:

Speech and SMS (Short Message System):
   This service type requires a peak bit rates up to 16 kbps. In the year 2010 onwards, there will still remain needs for these very low data rate applications of speech and simple message service. In addition to that, some applications in the field of sensor communication and/or low bit rate data telemetry would also be expected for the category, as ubiquitous communications. Most of mobile e-commerce applications would also be categorized in this type.

Multimedia and low rate data:
   This service type at a data rate of less than 144 kbps should also be considered, taking into account the compatibility with 3G and 2G data communication applications.

Medium multimedia:
   This type support a peak bit rate of up to 2 Mbps. This type would be required to sustain the compatibility with the 3G applications.

High multimedia:
   This type should be considered in order to accommodate high data rate applications, including multi-media video streaming services, which are provided with broadband service in fixed wired communication systems or with broadband wireless access systems.

Super high multimedia:
   This type should also be considered in order to accommodate super high data rates multi-media applications, which are currently provided with Fibre-to-the-Home (FTTH) services in case of wired communication systems.

Currently, these services require different communication devices with different connection facilities that the users need frequent switch between various terminals at home, office and in other environments.

A service usage pattern may be categorized according to an area where users exploit similar services and expect similar quality of service:

Home
   Office
   Public area
   Wide area

In many countries, wireline Internet access in Home, Office and Public Area becomes very popular and affordable. Meanwhile, WLAN (wireless local area network) access is evolving rapidly in these domains.

Second generation (2G) wireless mobile systems were mainly designed for applications such as voice. Third generation (3G) and especially, beyond third generation (B3G) mobile system will increasingly be designed as combination of different access technologies to complement each other in an optimum way for different service requirements and radio environments in order to provide a common and flexible service platform for different services and applications.

Access to a service or an application may be performed using one system or may be performed using multiple systems simultaneously or alternatively. Specifically, as will be described within the context of the present invention and has yet been un-addressed in the art, such improved technology could include an integrated and converged communication system which will combine the wireless mobile communication, wireline communication, wireless local area network, broadband wireless access system and Internet into one common platform so that the single Mobile Terminal can operate as a home phone, office phone, mobile phone and open terminal with single user number, which is the unique identifier of this common communication terminal.

In the future operators may deploy a mix of technologies that could, at various stages in time and subject to market and regulatory considerations, incorporate cellular, WLAN (wireless local area network), WMAN (wireless metropolitan area networks) or called BWA (broadband wireless access), WPAN (wireless personal access network), digital broadcast, satellite and other access systems as discussed by the present invention.

This will require the seamless interaction of these systems in order for the user to be able to receive a variety of content via a variety of delivery mechanisms depending upon the particular terminal capabilities, location and user profile.

Different radio access systems will be connected via the open and flexible core networks. In this way, an individual user can be connected via a variety of different access systems to the networks and services he desires. The integration and convergence between these different access systems in terms of horizontal and vertical handover and seamless service provision with service negotiation including mobility, security and QoS management will be a key requirement.

Due to the different application areas, cell ranges and radio environments, the different access systems can be organized in a layered structure similar to hierarchical cell structures in cellular mobile radio systems. The different layers correspond to the:

Distribution layer: This layer comprises digital broadcast type systems to distribute the same information to many users simultaneously through unidirectional links.
   Cellular layer: The cellular layer may comprise several cell layers with different cell size and or different access technologies.
   Hot spot layer: This layer may be used for very high data rate applications, very high traffic density and individual links, e.g. in very dense urban areas, campus areas, conference centers, and airports.

Personal network layer: Personal area networks will support short range direct communication between devices.

Fixed (Wired) layer: This layer includes any fixed wireline access system.

Such a common terminal system as provided by the present invention could intelligently converge mobile communications, Internet, wireline communications, wireless LAN, wireless MAN, wireless PAN, etc into an open system platform. Each of these represents a variety of applications, services and delivery mechanisms. These differing information flows are desired by the users to be available regardless of the means and manner of delivery. A case in point: With this common mobile terminal, one is able to receive voice communications, data messages, browse the web, transmit video, listen to MP3 music, etc at the most optimized way both in cost and spectrum. The most important is, this mobile terminal becomes the All-in-One common personal communicator at both home and office or on-the-move with unified single telephone number.

It is well predicted that 2G (second generation), 3G (third generation in its present state), B3G (beyond third generation), new mobile access and nomadic/local area wireless access elements are considered to be a system as a whole in the future. This converged and integrated communication platform as disclosed by the present invention, rather than separate and single mode of standards, will definitely drive the future telecommunication industry, but with new business model for service providers and operators.

Continuous evolution is foreseen in future mobile terminals, with use of new components, architectures, hardware, software platforms and improved user interfaces together providing increased performance. The key technologies that will enable the future advanced mobile terminals as described in the present invention include:

Open Wireless Architecture (OWA) supporting multiple standards

Smart antennas and new space/time coding and decoding techniques

High efficiency power amplifiers

New filters

Improved RF (radio frequency) modules, allowing higher operating frequencies and improved receiver sensitivity Advances in signal processing, additional processing power Improved battery technology with increased energy density High-performance and low-power signal processing and processor platform based on OWA Integration and convergence with wired terminal An unified global standard of mobile communications becomes extremely difficult and almost impossible. An Open Wireless Architecture (OWA) based converged wireless platform will thus become reasonable and feasible in both business and technology, and therefore ITU (international telecommunication union) IMT-Advanced standardization will be targeting this direction in long run.

Open Wireless Architecture (OWA) technology is the solution for the Fourth Generation wireless and mobile communications (4G) on the worldwide basis. OWA refers to the open broadband wireless platform that can support diverse wireless and mobile standards, and can integrate multiple wireless networks. To achieve this flexibility, OWA focuses on all aspects of a communication system such as RF (radio frequency), baseband processing, networking and application segments. The flexibility and adaptability required for the converged open wireless platform can be achieved by defining the open interface parameters for the OWA systems and sub-systems.

OWA helps in realizing global roaming facilities and seamless networking capabilities amongst different radio transmission technologies. It allows the network operators and subscribers to use third party solutions or user-defined solutions on their systems and to customize their systems according to their business models. Using OWA we can build systems which support multiple standards, multiple bands, multiple modes and offer diverse services to the customers.

OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the operating parameters including inter alia frequency range, modulation type, and/or output power limitations can be set or altered by software in order to support different radio frequency bands and/or standards. Though SDR has been improved a lot to support re-configurability and flexibility, it is a closed architecture in coupling different radios into one broadband transceiver. In other words, SDR may consume much more power and spectrum in exchange of the system flexibility. From the business point of view, SDR is not a cost-effective solution in wireless communications.

The advanced system and method disclosed in the present invention enable the full integration and convergence of the above technologies so as to substantially increase the productivity and versatility of the communications services offered.

SUMMARY OF THE INVENTION

This invention is directed to a common communication terminal for next generation wired, mobile and wireless communications to support the convergence and integration of various wireless standards including existing and future mobile cellular standards, wireless local area network standards, wireless personal area network standards, broadband wireless access standards and wireline standards.

The invention of this common communication terminal includes the following parts:

First, the system and method of the present invention incorporates a communication terminal integrating the Wireless LAN technology, Wireless PAN technology, Wireless MAN technology, Voice over IP (VoIP) technology and Wireline Internet Access technology with the existing common air interfaces mobile communication standards (for example, cdma2000, WCDMA, GSM, GPRS, TD-SCDMA, OFDM, WiMax, etc, but not limited thereto) through the Open Wireless Architecture (OWA) platform of the present invention. OWA defines the open interface standard for each subsystem and function unit so that the system is open for upgrade and reconfiguration. The method of present invention supports any short range wireless access technologies including Wireless LAN and Wireless PAN, but not limited thereto. Also, as utilized hereinafter the term "common air interface mobile standards" refers to any type of mobile cellular technology operable in the fashion of "TDMA (time division multiplex access) or CDMA (code division multiplex access) or OFDM (orthogonal frequency division multiplex)" but not limited thereto.

Second, the common terminal of the present invention supports multiple standards of both wireless and wireline communications wherein Software Defined Module (SDM) is used to install or update the different communication standards module. This SDM can be stored in an External Card, for example, flash memory card, SIM card (as used in GSM system), or downloadable from the Internet. The External Card of the SDM may also contain independent processor, DSP (Digital Signal Processor) or other components in addition to memory unit to facilitate additional system processing.

Third, the common terminal of the present invention supports open interface between the main functional units of the terminal and the RF/IF Subsystem so that the terminal RF/IF part is portable and reconfigurable. This method of the present invention is necessary when the different wireless standards run in different frequency bands which are not within same RF/IF transceiver limit. This open and portable RF/IF architecture of the present invention is also very important to support new wireless transceiver technologies including smart antennas, MIMO (Multiple Input, Multiple Output), High efficiency power amplifiers, Improved RF modules allowing multiple operating frequencies and improved receiver sensitivity, etc.

Fourth, the common terminal of the present invention incorporates automatic network access capabilities, wherein the terminal system searches the available network access in the order of wired network, Wireless LAN, BWA (broadband wireless access), mobile cellular network for example, but not limited thereto. The search order can be redefined or managed by the user. When the wired network is detected, this common terminal becomes the wireline terminal and the communication is established by IP connection including IP data and VoIP for voice. If wired network is not available, and Wireless LAN is detected, this common terminal becomes the Wireless LAN terminal and the communication is established by IP connection too. Wireless LAN access is regarded as the wireless extension of the wireline network access in the local short range domain. If both wired network and Wireless LAN are not available, the system of the present invention will search other short range wireless access networks including Wireless PAN, etc, or search broadband Wireless Metropolitan Area Networks (Wireless MAN). In the event that all these networks are not detected, the common terminal will switch back to the mobile cellular mode wherein common mobile air interface standards (for example, GSM/GPRS, cdma2000, WCDMA, TD-SCDMA, etc) will be employed based on the mobile preference list set by the user. The mobile cellular modules supported in the common terminal of the present invention can be stored in the terminal itself, or in the External Card or downloaded from the Internet in the form of the aforementioned SDM. The common terminal device associated with the system and method of the present invention is therefore capable of being operative in an open wireless and wireline communication environment supporting various standards and interfaces.

Fifth, the system and method of present invention incorporates a new incoming Call Processing Management subsystem capability in the Mobile Switching Center (MSC) and/or Mobile Gateway, wherein the incoming mobile calls associated with the called mobile phone number are queued for further connecting to the destination terminal based on the Connection Table containing the current network access status of the destination terminal as set forth above. If this destination terminal connects to the wired Internet network (first priority for example) or Wireless LAN or Wireless MAN, the aforementioned incoming call is forwarded to the destination terminal directly through IP connection by IP-calling from MSC to the destination terminal as set forth above, wherein the Visitor IP address reported by the destination terminal is dialed, and VoIP (voice over IP) protocol is activated and employed if this incoming call is a voice call. If the destination terminal, as set forth above, does not connect to either the wired network or the wireless LAN or the wireless MAN, but connects to the mobile cellular network (for example, TDMA or CDMA or mobile OFDM), the aforementioned incoming call is forwarded to the related Base Station wherein the communication with the destination terminal is over the wireless air link (through allocated mobile transmission channel) of available mobile cellular standards. In case the destination terminal, as set forth above, is not able to access any above available networks, the MSC can forward the aforementioned incoming call to the user Home Server which is configured as a Virtual Mobile Server through IP connection, as will be described within the context of the present invention.

Sixth, the system and method of present invention comprises the utilization of the user home computer server with Internet access as the Virtual Mobile Server, as set forth above, supporting the aforementioned common terminal of the present invention with enhanced functions and services, for example, mobile secretary, mobile office, User Webpage server, Voice Mailbox server, Short Message Service (SMS) server, Multimedia Message Service (MMS) server and Document Center, etc. This Virtual Mobile Server, as set forth above, also takes the function of Special Service Management for the aforementioned common terminal on mobile location, emergency call, information collection, security and safety control, and network O&M (Operation and Maintenance), etc. Additionally, one Virtual Mobile Server, as set forth above, can support one or multiple common terminals of the present invention, wherein many such terminals can share the same Virtual Mobile Server.

Seventh, the system and method of present invention introduces a new innovative solution to converge and integrate the various communication devices into one open platform, wherein the conventional home phone, office phone and cellular phone, etc are combined together into an integrated and converged terminal, as set forth above, with one single communication number. Furthermore, the aforementioned common terminal of the present invention utilizes the existing or any future communication standards (including both wireless and wireline standards by changing or replacing the aforementioned SDM card) rather than relying on new defined transmission technologies. Specifically, as described within the context of the present invention, the aforementioned common terminal is just an improvement of the existing communication device, wherein this common terminal, as set forth above, is operable in each individual communication standard and backwards compatible to the same individual transmission technology.

Lastly, the system and method of present invention comprises the best and optimal utilization of the existing communication infrastructure, wherein almost all existing telecommunication equipments, including MSC (Mobile Switching Center), BS (Base Station), Gateway and Router, and backbone networks, but not limited thereto, remain unchanged and fully operable.

The advantage of the common communication terminal system and method of the present invention includes remarkable improvement of spectrum efficiency in mobile cellular bands, improvement in network resource and radio transmission resource, optimization in network interoperability, enhancement of the emerging broadband availability, convergence of entertainment and Voice/Data services, interaction and integration of various communication devices and defining the future intelligence of truly smart and service-oriented communication environment. More specifically, the system of the present invention provides the capability of the true Personal Communications, wherein one single terminal with one single number manages all personal communications needs everywhere and anytime.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which.

Like reference numerals refer to like parts throughout the several views of the drawings.

DESCRIPTION OF THE PREFERRED EMBODIMENT

The present invention relates to a system and method of common communication terminal wherein the mobile cellular standards, including existing or future standards, can integrate to and converge with the short range wireless access standards (for example, Wireless LAN and Wireless PAN, but not limited thereto), broadband wireless metropolitan area networks (Wireless MAN, for example, Broadband Wireless Access system, but not limited thereto) and wireline network standards including Internet, into an open communication platform so that the same integrated common terminal device can be operable in various communications environment to maximize the wireless spectrum utilization, and broadband services and applications, as well as optimize the network resource management and system capacity management.

Figure 1:
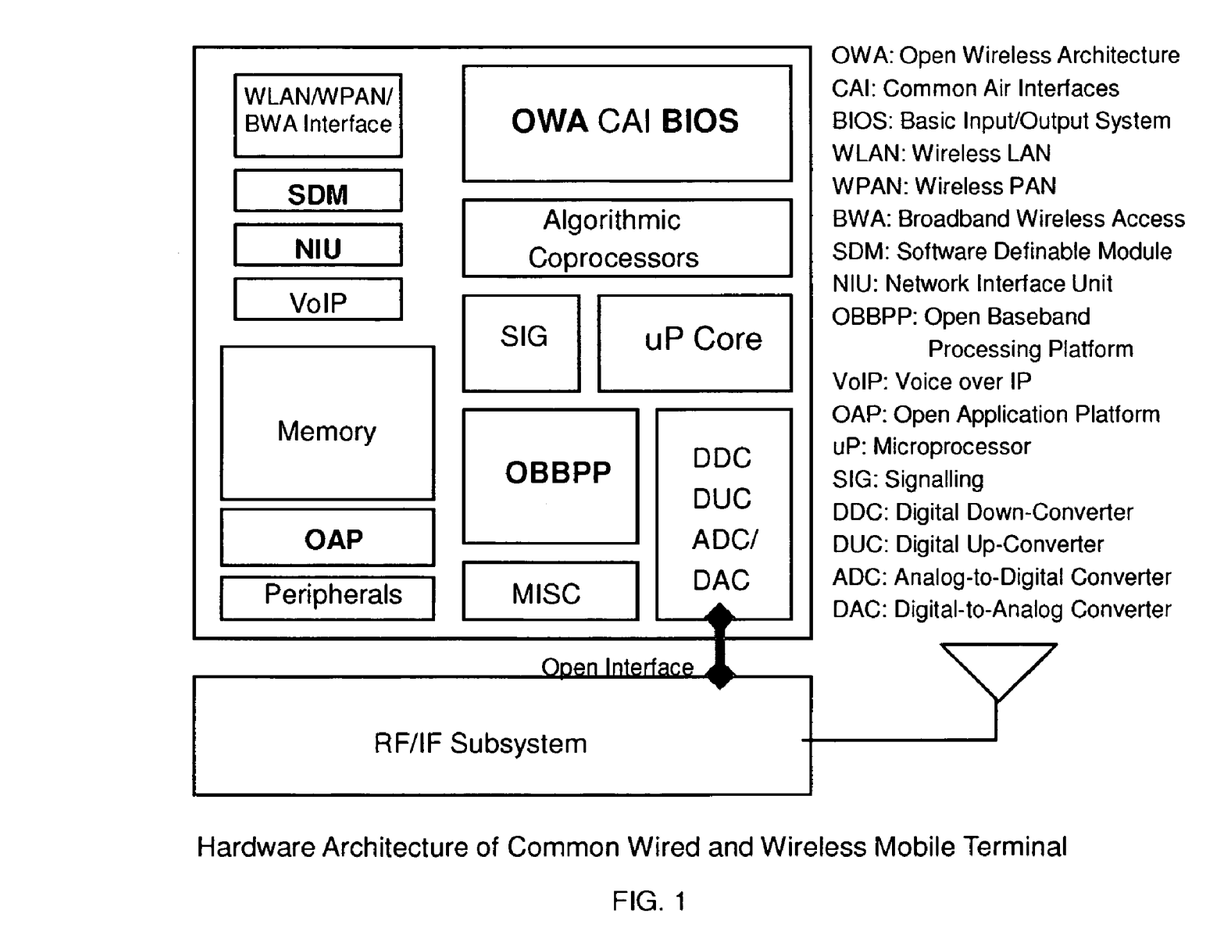
FIG. 1 is a hardware architecture of the common Wired and Wireless Mobile Terminal, wherein main functional modules of this invention are disclosed.

FIG. 1 is the hardware architecture of the common wired and wireless mobile terminal of the present invention, wherein the key functional units are:

Open Wireless Architecture (OWA) Common Air-Interface (CAI) BIOS (Basic Input/Output System)—this function unit defines the basic open platform to support various wireless air interfaces (or called radio transmission technologies) including existing standards and future to-be-defined standards. Open architecture is very important for next generation communication systems because it allows different modules and subsystems to be provided by various different vendors through the open interface standards. OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the operating parameters including inter alia frequency range, modulation type, and/or output power limitations can be set or altered by software in order to support different radio frequency bands and/or standards. Though SDR has been improved a lot to support re-configurability and flexibility, it is a closed architecture in coupling different radios into one broadband transceiver. In other words, SDR may consume much more power and spectrum in exchange of the system flexibility. From the business point of view, SDR is not a cost-effective solution in commercial wireless communications.

Wireless LAN/Wireless PAN/Wireless MAN Interface—this functional unit provides the short range wireless network access including wireless local area network (WLAN, for example IEEE 802.11 standard) and/or wireless personal area network (WPAN, for example IEEE 802.15 or UWB, Ultra Wide Band), and broadband Wireless Metropolitan Area Networks (WMAN, for example IEEE802.16 standard). However, as utilized hereinafter the term "Wireless LAN/Wireless PAN/Wireless MAN" refers to any type of short range wireless broadband technology and broadband wireless access systems technology operable in the fashion of "IEEE 802.11/15/16", but not limited thereto.

"VoIP (Voice over IP)" Unit provides a state-of-the-art solution to transmit real-time voice service over IP networks, wherein the common terminal device of the present invention may connect to the wired Internet network directly through a Network Interface Unit (NIU) interface, for example, USB port or Ethernet port, or connect to the Internet through a Wireless LAN, Wireless PAN or other Broadband Wireless Access system, whichever is available with user-defined search order, but not limited thereto.

Software Defined Module (SDM)—this functional module supports multiple wireless standards (air-interfaces) for the common terminal of the present invention. The module can be stored in the aforementioned terminal device, or in the external card or downloaded from the Internet. The OWA of this invention supports open air interfaces so that users can change different wireless standards, including existing standards or future standards, by updating or replacing this SDM module, as set forth above, wherein this SDM module may further contain independent processors or DSP (Digital Signal Processing) components in addition to memory units to facilitate signal processing and/or protocol processing of related standards, etc.

Radio Frequency (RF)/Intermediate Frequency (IF) Subsystem is a portable radio unit with open interface to the main functional units of the common terminal device of the present invention. This separate open radio subsystem is necessary to support various wireless standards running in different frequency bands, wherein the user may change this radio part in case of needs. Additionally, this open radio subsystem supports new wireless transceiver technologies, for example, smart antennas, MIMO (Multiple Input, Multiple Output), High efficiency power amplifiers, Improved RF modules allowing multiple operating frequencies and improved receiver sensitivity, etc, but not intended to be limited to such technologies.

Figure 2:
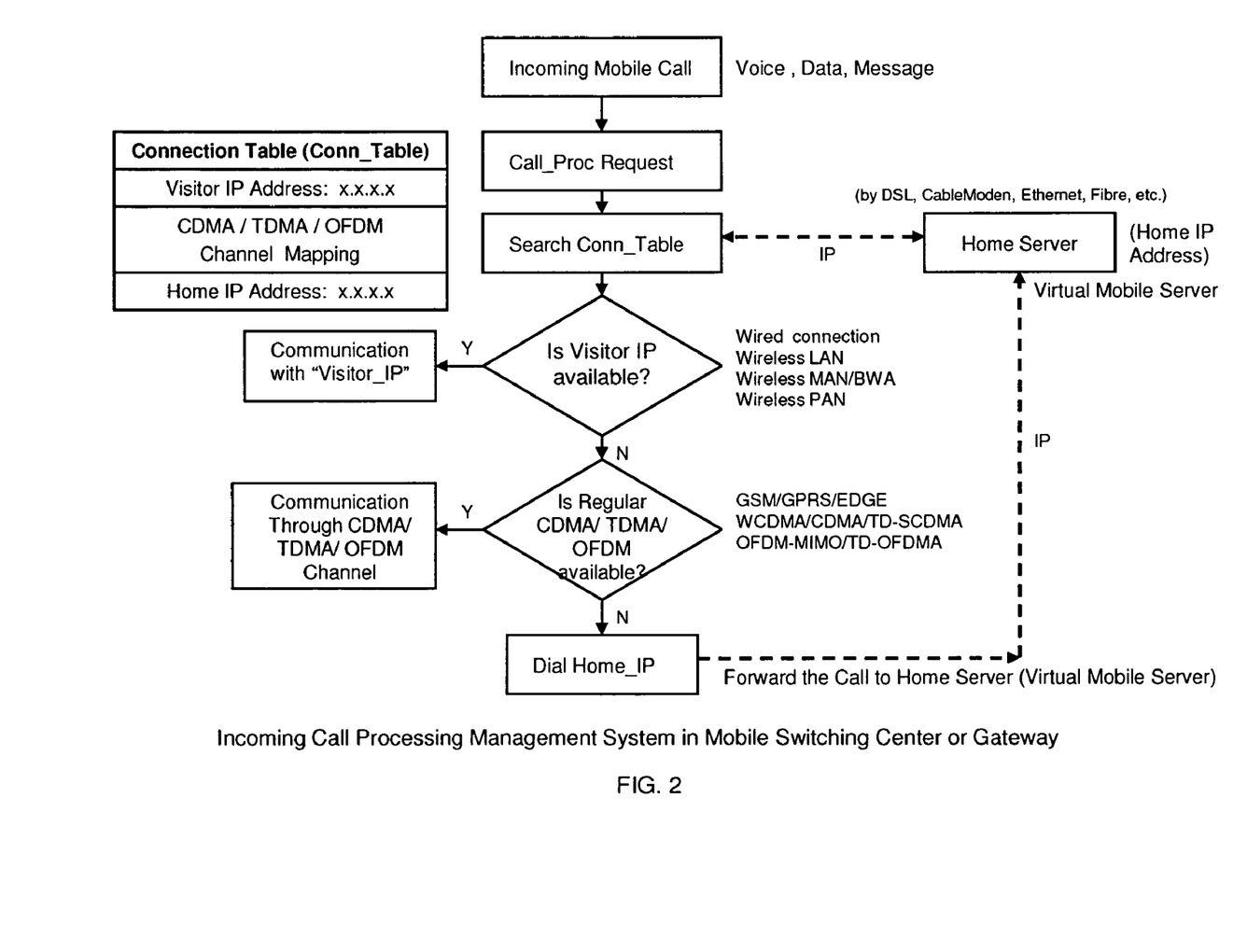
FIG. 2 is the incoming Call Processing Management System in Mobile Switching Center or Mobile Gateway, wherein the incoming calls are further forwarded to the aforementioned terminal device through IP connection or over the mobile air link channel.

FIG. 2 shows the incoming Call Processing Management System in Mobile Switching Center (MSC) or Mobile Gateway, associated with the common terminal device of the present invention, wherein the key control procedures are:

The Connection Table (Conn_Table) is frequently updated by the common terminal device, as set forth above, through specific network connections, wherein "Visitor IP address" is reported in case of wired network connection or short range wireless access connection (for example, WLAN or WPAN) or broadband wireless access network connection based on IP connection. If there are no such IP connections available with the aforementioned common terminal device, the MSC, as set forth above, together with related base stations, communicates with this common terminal device over the mobile cellular networks, for example, CDMA networks, TDMA networks or OFDM networks, but not limited thereto, wherein the specific cellular air-link channel address is reported to the aforementioned Connection Table.

When an incoming mobile call request is received, the aforementioned MSC searches the Connection Table associated with the called common terminal device (or destination terminal in this case) of the present invention. If a Visitor IP address is found, the MSC dials or re-synchronize this IP address, through IP Switch in MSC (or other IP system in different infrastructure), to establish the IP connection accordingly. If this Visitor IP address is not available, and the regular mobile cellular channel address (for example, CDMA, TDMA or OFDM channel) is found and associated with the called destination terminal number, the MSC connects the related base station to establish the communication with the destination terminal device, as set forth above, over the mobile cellular air link/channel. This mobile cellular channel can be either static channel or dynamically assigned channel to optimize the wireless spectrum utilization.

However, it is emphasized that the system and method of the present invention utilizes the terms "MSC, Mobile Gateway, base station, etc", which in the context of the present invention, is meant to include the aforementioned existing CDMA system, TDMA/GSM system, OFDM system, or any other mobile communication infrastructure utilizing different network topology and/or network architecture with different terms which may or may not have all of the functional characteristics of existing CDMA or TDMA or OFDM standards. As such, the system and method of the present invention is not meant to be limited to current mobile cellular communication infrastructure, and the subsequent specific description utilization and explanation of certain characteristics previously recited as being characteristics of a MSC or base station or Mobile Gateway are not intended to be limited to such technology.

If after searching the Connection Table, as set forth above, both Visitor IP address and mobile cellular channel address (including CDMA or TDMA or OFDM channel) are not found, the aforementioned MSC has to forward the incoming call, over IP connection through possible IP Switch, but not limited thereto, to the user's Virtual Mobile Server (User Home Computer Server with Internet connection), wherein a fixed Home IP address is stored in the aforementioned Connection Table.

Therefore, the incoming call processing management system in MSC (or Mobile Gateway in packet mobile core networks) of the present invention requires the minimum modification of the existing mobile communication infrastructure, wherein only the aforementioned Connection Table is updated, and a VoIP interface unit is employed for any voice call over the IP connection.

Figure 3:
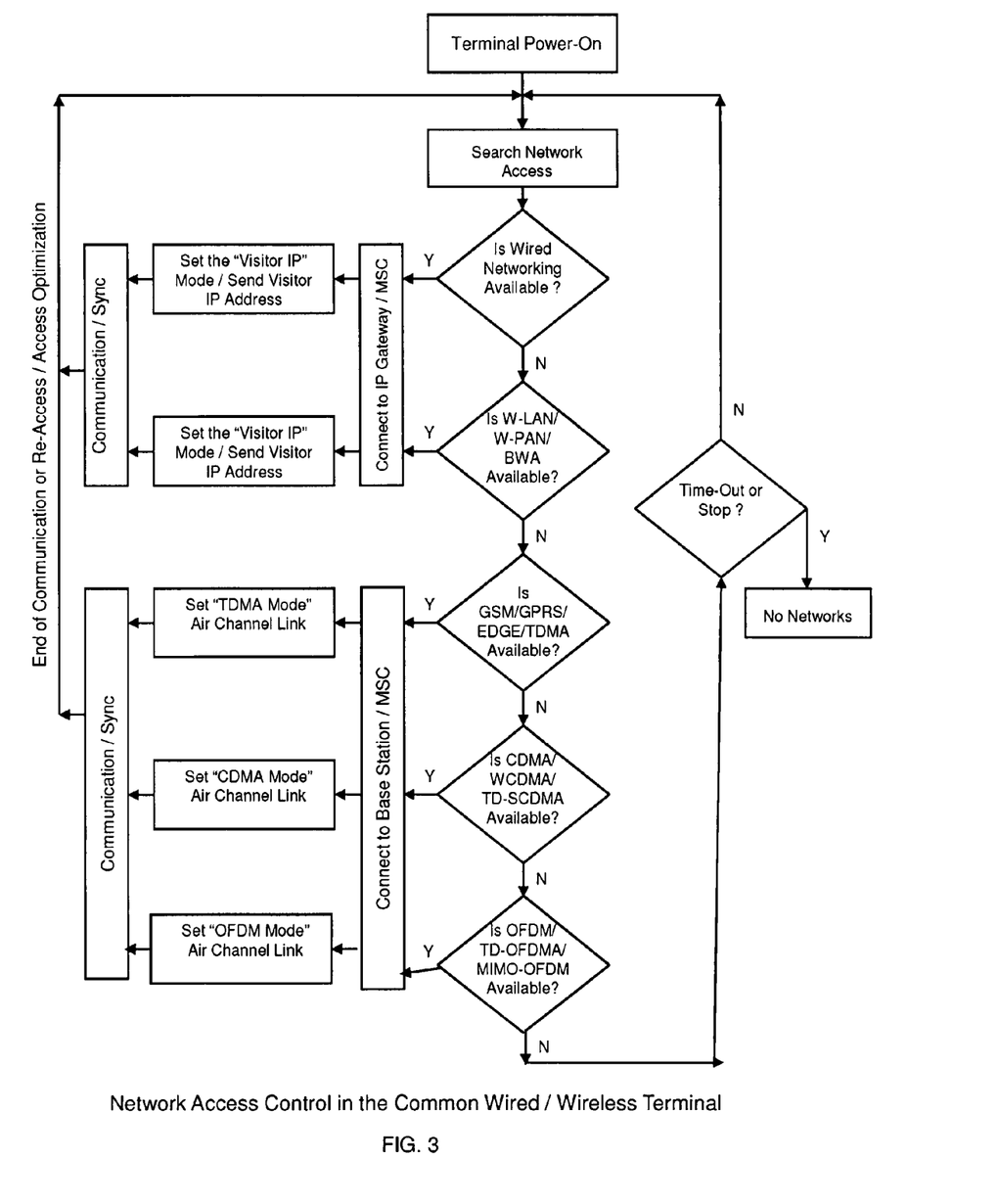
FIG. 3 introduces the Network Access Control scheme in the common terminal device of the present invention, based on the preset network access order to maximize the spectrum utilization efficiency and the cost effectiveness.

FIG. 3 describes the network access control method in the common terminal device of the present invention, wherein a Wired/W-LAN/W-PAN/W-MAN/TDMA/CDMA/OFDM common terminal is discussed for example, but not limited thereto.

After the common terminal device is powered on, the system of the present invention automatically searches for available network accesses based on criteria and parameters of different communication standards. If a wired Internet connection is found, the common terminal device of the present invention connects directly to the IP Switch (or other IP system in different communication infrastructure) in the aforementioned Mobile Switching Center (MSC), and sends the "Visitor IP" address", obtained from the local Internet access point, to the aforementioned Connection Table in MSC as set forth above, and sets the "Visitor IP" mode accordingly. Then, the connection may be established through the IP protocol, and the common terminal device of the present invention becomes synchronized with the aforementioned MSC.

If the wired Internet connection is not available, the common terminal device of the present invention searches for Wireless LAN (WLAN) access in the local short range area. Since WLAN is only the wireless extension of the wired network in a short range area, if such WLAN access is found, the common terminal of the present invention repeats the same procedures, as set forth above, to connect to the aforementioned MSC in the same manner as it does to the wired network.

If both wired network and WLAN are not available, the common terminal device of the present invention continues to search Wireless MAN or BWA (broadband wireless access systems). Since Wireless MAN is the large area extension of the wired network, if such Wireless MAN access is found, the common terminal of the present invention repeats the same procedures, as set forth above, to connect to the aforementioned MSC in the same manner as it does to the wired network.

If all of the wired network, WLAN and WMAN are not available, the common terminal device of the present invention switches back to the mobile cellular mode, for example GSM/TDMA mode or CDMA mode or OFDM mode, wherein the specific base station is connected over the specific air channel link, and the specific cellular air channel address is updated in the aforementioned Connection Table of the MSC, as set forth above.

The aforementioned network access control of the common terminal device of the present invention is in the priority order of Wired network, WLAN, WMAN, TDMA, CDMA and OFDM, for example, to maximize the wireless spectrum utilization efficiency and broadband services. However, this access control order can be re-defined by the user with the common terminal device of the present invention. Additionally, the system and the method of the present invention has the function to frequently search for the higher priority network access mode whenever the connection is in the low priority mode to optimize the network access control for the common terminal device of the present invention.

It is emphasized again that the common terminal device of the present invention utilizes the examples of "Wired/WLAN/WMAN/TDMA/CDMA/OFDM" networks, which in the context of the present invention, is meant to include the aforementioned communication standards or any other existing and future standards of wireless and wired transmission technologies. As such, the common terminal device of the present invention is not meant to be limited to WLAN, WMAN, GSM/TDMA, CDMA and OFDM technologies, and the subsequent specific description utilization and explanation of certain characteristics previously recited as being characteristics of the above standards are not intended to be limited to such technologies.

Figure 4:
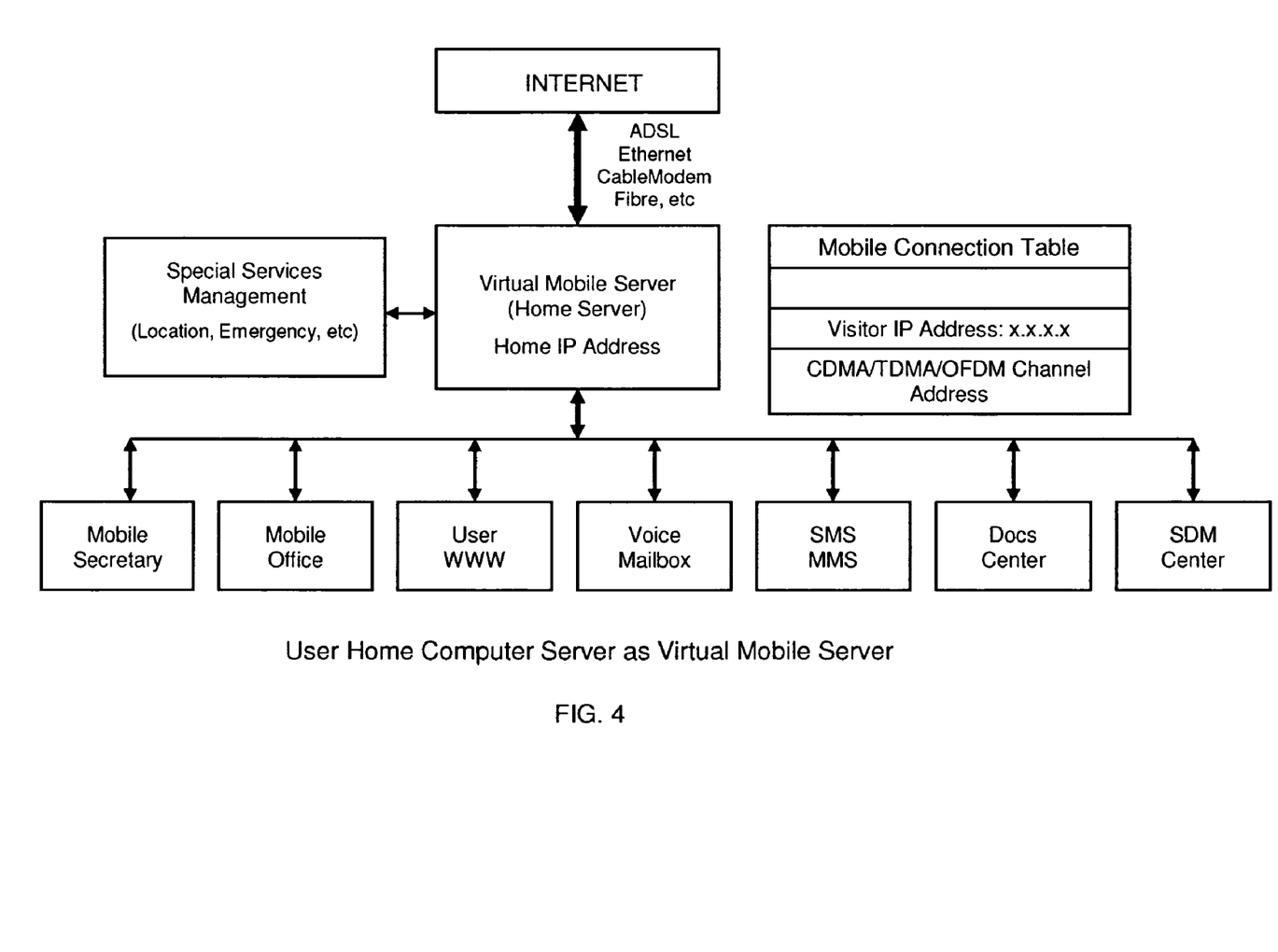
FIG. 4 is a server structure configuring the user home computer with Internet access as a Virtual Mobile Server of the common terminal device of the present invention.

FIG. 4 introduces to utilize the user home computer, with Internet access, as a Virtual Mobile Server for the common terminal device of the present invention, wherein the key disclosures are:

The Virtual Mobile Server, basically a User Home Computer Server, has a fixed Home IP address, connecting to the wireline Internet through Fibre, Cable Modem, Ethernet or DSL (Digital Subscriber Loop), but not limited thereto.

The Virtual Mobile Server, as set forth above, maintains an updated and real-time copy of the Connection Table from the aforementioned Mobile Switching Center (MSC) or Mobile Gateway.

One Virtual Mobile Server, as set forth above, can support one or multiple common terminals of the present invention, wherein many such terminal devices can share the same Virtual Mobile Server.

The Virtual Mobile Server, as set forth above, supports such important services and applications as "Mobile Secretary", "Mobile Office", "User Webpage server", "Voice Mailbox server", "Short Message Service (SMS) and Multimedia Message Service (MMS) server", "Game Center", "Document Center" "SDM Data Center", etc., but not limited thereto.

The Virtual Mobile Server, as set forth above, also provides the common terminal device of the present invention of Special Services Management such as Location management, Emergency call management, Security and Safety management, Access Optimization, Digital spectrum management, and Operation and Maintenance management, etc., but not limited thereto.

Basically, any computer server with Internet connection and with an IP address can be configured to be an aforementioned Virtual Mobile Server, associated with the common terminal device of the present invention.

Figure 5:
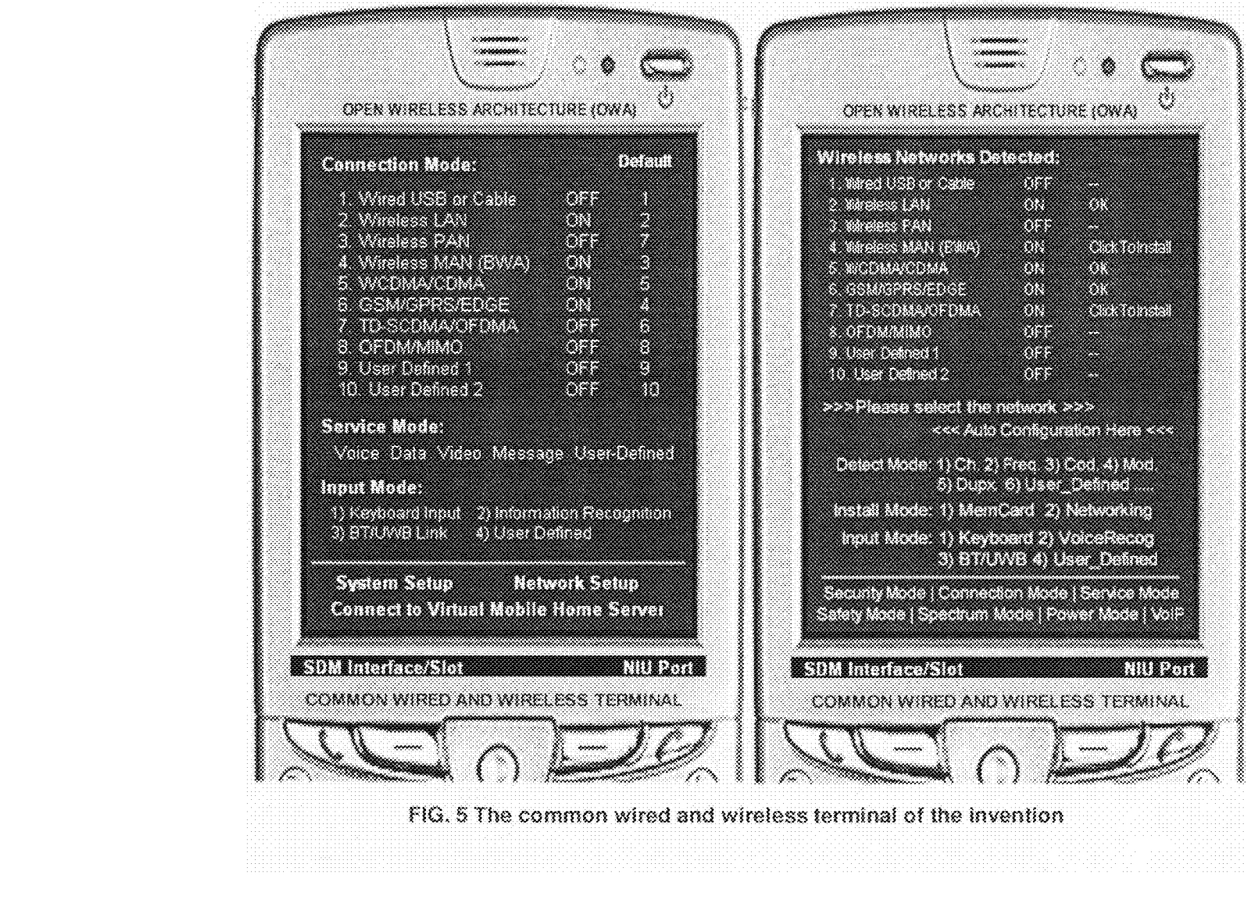
FIG. 5 is a demo of the common terminal device of the present invention, wherein basic functions in services and applications are described.

FIG. 5 demonstrates a prototype common Wired and Wireless Terminal of the present invention, wherein the key characteristics are:

The prototype common terminal device of the present invention supports various connection modes, for example, wired networks via USB or Cable port, Wireless LAN, Wireless PAN, Wireless MAN, cdma2000, WCDMA, GSM/GPRS, TD-SCDMA, OFDM or any user defined standards, wherein the network access priority order is defined by the terminal user, for example, Wired USB/Cable mode has the first priority order in the prototype terminal device.

"SDM (Software Defined Module) Interface/Slot" is utilized to plug-in the External Card—an external memory card or processing card as set forth above, to install or change the communication standards module including wireless air-interfaces. Additionally, this SDM Slot is also utilized for inserting the system testing module.

In addition to the aforementioned SDM External Card method, the communication standards module can also be downloaded and installed from the Internet through the Network Interface Unit (NIU), as set forth above, wherein the modules may be downloaded from the Virtual Mobile Server, as set forth above.

The prototype common terminal device of the present invention supports all available services including voice, data, messages and video, and other user defined services.

The prototype common terminal device of the present invention supports flexible input modes including Keyboard Input (screen keyboard), Information Recognition (including voice recognition and/or text recognition), Bluetooth/Ultra Wide Band wireless Input and other user defined input methods.

Additionally, the prototype common terminal device of the present invention comprises capabilities to connect with the Virtual Mobile Server, as set forth above, whenever the Internet access is available and the bandwidth allows, to enhance the communication services and applications, retrieve useful information, reconfigure the system setup and optimize the network access control, etc.

The common terminal system and method of the present invention is not meant to be limited to the aforementioned prototype terminal, and the subsequent specific description utilization and explanation of certain characteristics previously recited as being characteristics of this prototype terminal are not intended to be limited to such technologies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An outgoing network access method of a common communication terminal architecture supporting multiple network access capabilities, said method comprising simultaneously connecting a common terminal to both a Mobile Switching Center (MSC) and a Virtual Mobile Server (VMS) whenever an IP (Internet Protocol) network connection is available for said common terminal in order to optimize the system performance, transmission performance, user applications and quality of service for said common terminal, wherein said method further comprising:
   a) Establishing communication between said common terminal and said MSC through said IP connection with a Visitor IP address when a wired network is available for said common terminal,
   b) Establishing communication between said common terminal and said MSC via Wireless LAN (Local Area Network) or Wireless PAN (Personal Access Network) or BWA (Broadband Wireless Access) through said IP connection with said Visitor IP address when said wired network is not available, but said Wireless LAN or said Wireless PAN or said BWA is available for said common terminal,
   c) Connecting said common terminal to said MSC via cellular base station over a mobile cellular air-link channel when all of said wired network, said Wireless LAN, said Wireless PAN and said BWA are not available for said common terminal, and
   d) Synchronizing said common terminal to said VMS with a Home-IP address whenever said IP connection is available between said common terminal and said MSC.

2. The method as recited in claim 1 comprising searching for multiple network access wherein the default access priority order from high to low is said wired network, said Wireless LAN, said Wireless PAN, said BWA and said mobile cellular network.

3. The method as recited in claim 1 wherein said VMS further maintaining an updated and real-time copy of a Connection Table containing the most updated information of said Visitor IP address and said mobile cellular air-link channel address of said common terminal, and a Software Defined Module (SDM) data center for said common terminal.

4. The method as recited in claim 3 wherein said SDM is a portable open module containing parameters, algorithms, protocols of different wireless air interfaces.

5. The method as recited in claim 3 wherein said SDM contains one or multiple different wireless air interfaces installed from a SDM external memory and processing card or downloaded from the Internet.

6. The method as recited in claim 1 comprising utilizing said Visitor IP address in said common terminal wherein said Visitor IP address can be static fixed IP address or dynamic IP address.

7. The method as recited in claim 1 comprising processing said network access based on an unified user Telephone Number identified for said common terminal registered in said MSC wherein said Telephone Number is an unified and common communication identifier (ID) for said common terminal used in any access networks and any network access modes to converge an office phone, home phone, mobile phone and other access equipments' numbers to one single said Telephone Number.

\* \* \* \* \*